April 7, 1942.     R. C. CROSS     2,279,133
MANUFACTURE OF PISTON AND OTHER RINGS FROM WIRE
Filed Aug. 8, 1941
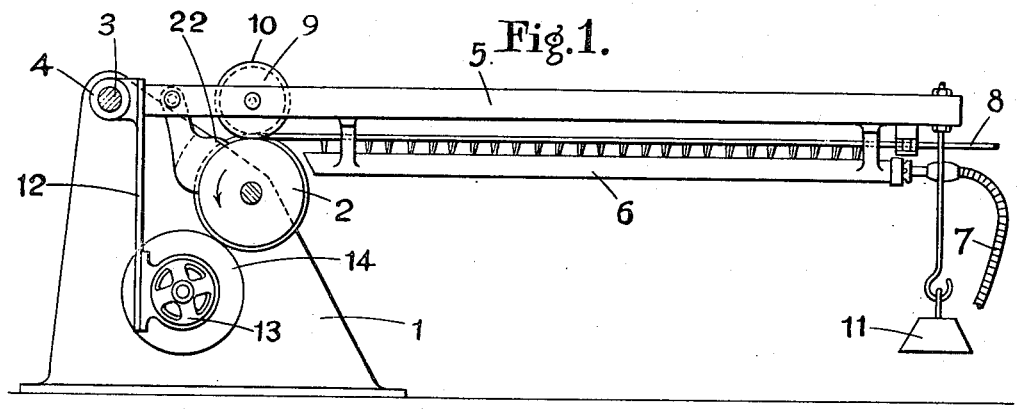
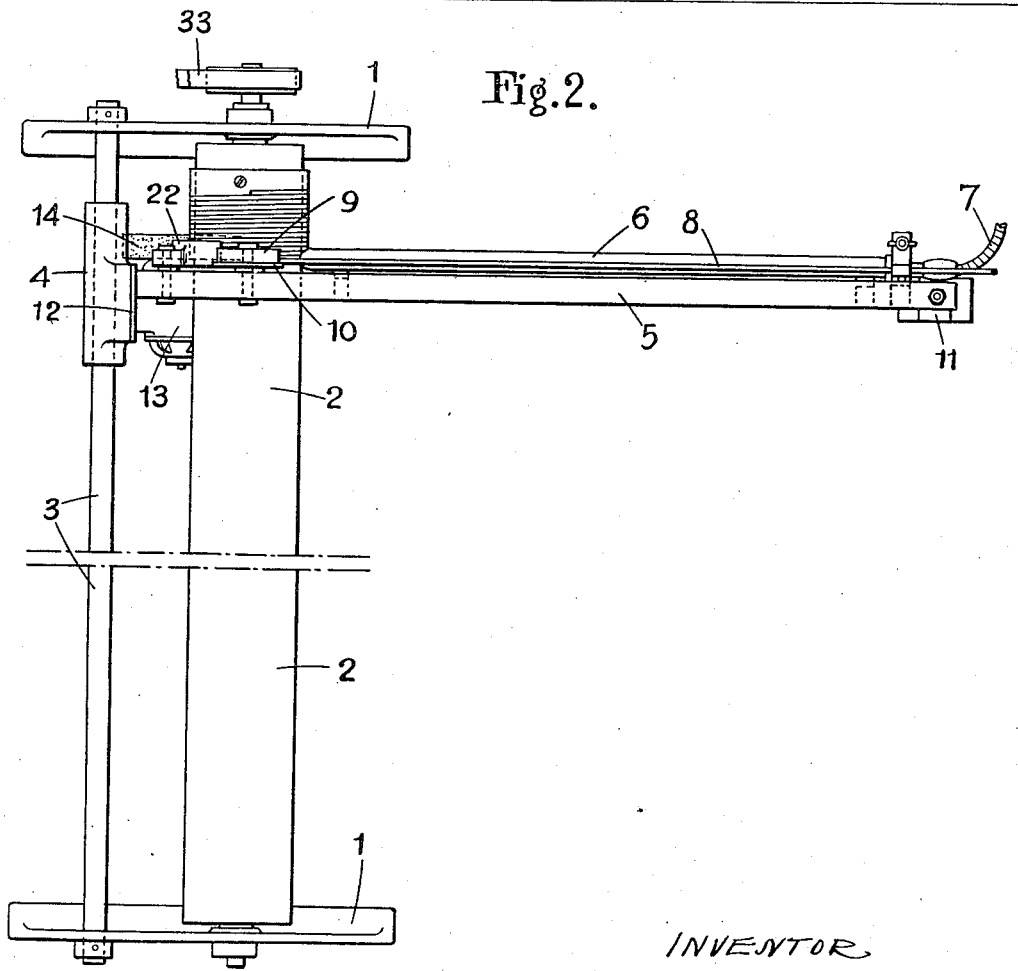
INVENTOR
ROLAND C. CROSS
By Willhampton & Groff Attys Patented Apr. 7, 1942

2,279,133

UNITED STATES PATENT OFFICE 2,279,133

MANUFACTURE OF PISTON AND OTHER RINGS FROM WIRE

Roland Claude Cross, Bath, England

Application August 8, 1941, Serial No. 406,038
In Great Britain March 18, 1940

10 Claims. (Cl. 140—88)

This invention relates to the manufacture of piston or other rings from drawn wire and has for its object to provide a method of and means for producing improved wire rings having properties which will make them especially suitable for incorporation in machinery as packing or other rings, and particularly as piston rings for internal combustion engines.

According to the invention, in a method of manufacturing piston or other rings of wire, more particularly square or rectangular section wire, a cold wire pre-drawn accurately to a requisite cross-section is heated and whilst in the red hot state is continuously wound on a cool or cooled mandrel, thereby producing a hardened or annealed body (according to the metal of the wire) of helical formation, the helical body being cut up into individual rings and the rings being subsequently trued from the helical formation to the flat form. The rings so made may then be subjected to any desired or necessary subsequent treatment, for example their outer peripheral surface may be lapped as set forth in the prior British specification No. 513,407 (Cross and another) and as described in the said specification the lapping process may be applied, if desired, to the helical body prior to same being cut up into rings.

It will be seen that by this method the wire is subjected to heat treatment simultaneously with the making of the rings and that if applied to steel wire of suitable carbon content the method will result in hardened rings owing to the application thereto of heat and the subsequent cooling, whereas if the method is applied to copper, bronze or brass wire the method will result in annealed rings. The hardened steel rings may be used, for example, as packing rings in conjunction with cylinders of a comparatively soft metal, for example aluminium whereas the bronze or other rings may be used as packing rings in conjunction with cylinders of a hard material, for example hardened steel, in agreement with well established laws governing bearing combinations.

In carrying into effect the improved method in accordance with one embodiment thereof, a wire of square section is unwound from a coil and is passed over a plurality of burners and continuously wound on a cool or cooled mandrel in the hot state. If desired, the wire may be subjected during winding to the action of guiding means to form it into a close wound coil on the mandrel, and also to polishing means to give the outer peripheral surface a high degree of polish simultaneously with the winding operation. The coil is then removed from the mandrel and cut up into individual rings which are subsequently trued into a plane and may be subjected to any desired further treatment.

The invention also embraces means for carrying into effect the method referred to above, and an embodiment of such means is shown by way of example in the accompanying drawing, wherein:

Figure 1 is a diagrammatic end elevation of a machine for carrying into effect the improved method; and Figure 2 is a corresponding plan view.

Referring to the drawing, the machine therein shown comprises a frame 1 in which is rotatably mounted a mandrel 2 adapted to be driven by the belt 33. The frame 1 has also mounted therein a fixed shaft 3 on which a heating, winding and polishing assembly or carriage is rockably mounted and is adapted to travel in a direction parallel to the longitudinal direction of the mandrel. The said assembly comprises a beam 5 mounted on the sleeve 4. The beam 5 has secured thereto in parallel disposition a tube 6 provided with a series of holes and forming a multi-flame Bunsen burner, to which gas is supplied through the flexible tube 7. The wire 8 is unwound from a reel (not shown) and is guided to travel over the burner tube 6 so as to be subjected to the jets of flame issuing therefrom. By the time the wire passes over the last jet in its direction of travel it is red hot and is wound in this condition on the mandrel 2 in close coil. During winding the wire is pressed on to the surface of the mandrel by a roller 9 which is shouldered as at 10 and is rotatably mounted in the beam 5. The roller 9, 10 ensures that the coil of wire assumes the shape of the mandrel and also that the convolutions tightly follow one another.

The beam 5 has also mounted thereon a pad 22 conveniently made of bronze and having a ledge in the same plane as the shoulder 10 of the roller 9. The said ledge bears against the last convolution of the coil as same is formed and accordingly it is constrained to move along in the longitudinal direction of the mandrel as the length of the coil increases, taking with it the whole assembly mounted on the sleeve 4. The pad 22 thus acts as a feed element for moving the assembly along longitudinally and no other driving means is required for this purpose. It will be observed that the assembly, being rockable about the shaft 3, acts as a one armed lever, with the result that almost the entire turning moment exerted by the assembly is applied to the roller 9 so that same may press the wire 8 on the mandrel 2. Should this pressure be found insufficient the said turning moment may be increased by the employment of a weight 11 suspended from the free end of the beam 5.

The sleeve 4 may have mounted thereon a bracket 12 carrying a small electric motor 13 having mounted on its shaft a mop 14 applied against the coil of wire on the mandrel so that the outer surface of said coil may be polished as the coil is formed.

The mandrel 2, may be a solid body, for example of steel or cast iron, or it may be hollow and circulation of air or other coolant may be arranged therethrough if desired or found necessary.

It will be seen that the hot wire coming into contact with the mass of the cool or cooled mandrel 2 and associated masses 9 and 22 is quenched but not so instantaneously as if the wire were plunged into cold water or the like. If the wire is of steel, hardening and tempering will result, since on being quenched sufficient heat is left in the wire to become tempered after the initial quenching. If, on the other hand, the wire is of bronze, copper or brass, the quenching will result in annealing the wire as indicated above.

Obviously, both the heating and cooling effect applied to the wire may be regulated as desired, or as may be most suitable for the particular kind of wire treated, or in accordance with the desired properties of the rings to be made.

The invention enables very hard, flat and round steel piston rings to be made which may be gapped by pulling apart the ends and overstressing the material, or should it be required to make a ring which is not strictly round, the mandrel may be shaped accordingly and the wire will follow the shape of the mandrel faithfully. In this latter case, for example, a mandrel of slightly oblate section may be employed, and upon removal of the coil the rings may be cut therefrom with a sufficiently wide gap to obtain circular rings when they are compressed to close the gap.

I claim:

1. A machine for preparing continuous wire stock for the manufacture of piston or other rings, comprising means for heating the wire, a driven cool mandrel on which the wire is wound while hot, means for guiding the wire to cause same to assume the shape of the mandrel in uniform convolutions, the said heating and guiding means being mounted on a beam pivoted to a shaft parallel to the mandrel, and said beam being adapted to travel on said shaft together with all the heating and guiding and other parts mounted thereon.

2. A machine for preparing continuous wire stock for the manufacture of piston or other rings, comprising means for heating the wire, a driven cool mandrel on which the wire is wound while hot, means for guiding the wire to cause same to assume the shape of the mandrel in uniform convolutions, the said heating and guiding means being mounted on a beam pivoted to a shaft parallel to the mandrel, and said beam being adapted to travel on said shaft together with all the heating and guiding and other parts mounted thereon, there being combined with the beam and the heating and guiding means, so as to form part of the travelling assembly, a mop adapted to polish the outer surface of the coil of wire formed on the mandrel, said mop being mounted on and carried by a travelling motor.

3. A machine for preparing continuous wire stock for the manufacture of piston or other rings, comprising means for heating the wire, a driven cool mandrel on which the wire is wound while hot, guiding means for the wire comprising a roller the periphery of which presses the wire on to the mandrel and which has a shoulder which bears laterally against the wire and constrains it to be formed into a close coil on the mandrel, the said heating and guiding means forming an assembly adapted to travel in the longitudinal direction of the mandrel.

4. A machine for preparing continuous wire stock for the manufacture of piston or other rings, comprising means for heating the wire, a driven cool mandrel on which the wire is wound while hot, guiding means for the wire comprising a roller the periphery of which presses the wire on to the mandrel and which has a shoulder which bears laterally against the wire and constrains it to be formed into a close coil on the mandrel, the said heating and guiding means being mounted on a beam pivoted to a shaft parallel to the mandrel, and said beam being adapted to travel on said shaft together with all the heating and guiding and other parts mounted thereon.

5. A machine for preparing continuous wire stock for the manufacture of piston or other rings, comprising means for heating the wire, a driven cool mandrel on which the wire is wound while hot, means for guiding the wire to cause same to assume the shape of the mandrel in uniform convolutions, the said heating and guiding means being mounted on a beam pivoted to a shaft parallel to the mandrel, and said beam being adapted to travel on said shaft together with all the heating and guiding and other parts mounted thereon, in combination with a pad mounted on the beam and having a ledge applied to the increasing end of the coil formed on the mandrel and serving as a feed element for pushing the assembly along in the longitudinal direction of the mandrel by the action of the growth of the coil on the mandrel.

6. A machine for preparing continuous wire stock for the manufacture of piston or other rings, comprising a multi-flame Bunsen burner for heating the wire, a driven cool mandrel on which the wire is wound while hot, means for guiding the wire to cause same to assume the shape of the mandrel in uniform convolutions, the said heating and guiding means forming an assembly adapted to travel in the longitudinal direction of the mandrel.

7. A machine for preparing continuous wire stock for the manufacture of piston and other rings, comprising in combination, a cooling mandrel, a carriage supported to move parallel to the axis of the mandrel, said carriage including means for heating the wire prior to coiling on the mandrel, and means cooperating with the wire as it is being wound on the mandrel to feed the carriage across the mandrel.

8. A machine for preparing continuous wire stock for the manufacture of piston and other rings, comprising, a rotatably supported cooling mandrel and a shaft spaced therefrom in parallel relation, a carriage shiftably mounted on said shaft for supplying heated wire to the mandrel, and means on the carriage for engaging the leading convolution of wire coiled on the mandrel for feeding the carriage progressively across the mandrel.

9. A machine for preparing continuous wire stock for the manufacture of piston and other rings, comprising, a rotatably mounted cooling mandrel, a shaft mounted parallel to the axis of the mandrel, a carriage including a sleeve shiftably mounted on the shaft, a beam extending radially from the sleeve, means for guiding continuous wire stock along the beam, heating means carried by the beam for heating the wire as it progresses through said guiding means toward the mandrel, and a roller carried by the beam for engaging the increasing end of the coil formed on the mandrel to feed the carriage across the same.

10. A machine for preparing continuous wire stock for the manufacture of piston and other rings from continuous wire, comprising, a rotatable cooling mandrel and a shaft mounted in spaced relation thereto, a sleeve shiftably mounted on the shaft, a beam extending radially from the sleeve, means for guiding continuous wire stock along the beam, means carried by the beam for heating the wire as it progresses through said guiding means toward the mandrel, coil compacting and beam feeding means on the beam adapted to cooperate with the increasing end of the coil formed on the mandrel to cause the wire to closely follow the mandrel and also feed the beam across the same, and means also carried with the beam to polish the exposed face of the wire convolutions.

ROLAND CLAUDE CROSS.